(12) United States Patent
Berruet et al.

(10) Patent No.: US 9,933,062 B2
(45) Date of Patent: Apr. 3, 2018

(54) MECHANICAL SYSTEM FORMING A CAM FOLLOWER OR A ROCKER ARM

(71) Applicants: Nicolas Berruet, Artannes sur Indre (FR); François Champalou, Chaumont-sur-Loire (FR); Samuel Viault, Saint-Antoine-du-Rocher (FR)

(72) Inventors: Nicolas Berruet, Artannes sur Indre (FR); François Champalou, Chaumont-sur-Loire (FR); Samuel Viault, Saint-Antoine-du-Rocher (FR)

(73) Assignee: AKTIEBOLAGET SKF, Gothenburg (SE)

(*) Notice: Subject to any disclaimer, the term of this patent is extended or adjusted under 35 U.S.C. 154(b) by 0 days.

(21) Appl. No.: 14/867,009

(22) Filed: Sep. 28, 2015

(65) Prior Publication Data

US 2016/0091073 A1   Mar. 31, 2016

(30) Foreign Application Priority Data

Sep. 30, 2014 (EP) .................................... 14306538

(51) Int. Cl.
| | |
|---|---|
| *G05G 1/00* | (2006.01) |
| *F16H 53/06* | (2006.01) |
| *F01L 1/18* | (2006.01) |
| *F02M 59/10* | (2006.01) |
| *F01L 1/14* | (2006.01) |
| *F04B 1/04* | (2006.01) |

(52) U.S. Cl.
CPC .............. *F16H 53/06* (2013.01); *F01L 1/143* (2013.01); *F01L 1/18* (2013.01); *F02M 59/102* (2013.01); *F04B 1/0417* (2013.01); *F04B 1/0426* (2013.01); *F01L 2105/00* (2013.01); *F01L 2810/02* (2013.01)

(58) Field of Classification Search
CPC .. F16H 53/06; F01L 1/14; F01L 1/143; F04B 1/0426
See application file for complete search history.

(56) References Cited

U.S. PATENT DOCUMENTS

| | | | |
|---|---|---|---|
| 3,628,629 A | 12/1971 | Phillips | |
| 4,204,814 A | 5/1980 | Matzen | |
| 4,231,267 A * | 11/1980 | Van Slooten | F01L 1/245 123/90.48 |

(Continued)

FOREIGN PATENT DOCUMENTS

| | | |
|---|---|---|
| DE | 102010022319 A1 | 12/2011 |
| DE | 102012219506 A1 | 4/2014 |

(Continued)

*Primary Examiner* — Vicky A Johnson
(74) *Attorney, Agent, or Firm* — Bryan Peckjian; SKF USA Inc. Patent Dept.

(57) ABSTRACT

A mechanical system forms a cam follower or a rocker arm. The mechanical system comprises: a support element, a pin extending between two opposite ends along a first axis and supported by the support element, and a roller adapted to receive the pin. The roller being mounted on pin, movable in rotation relative to the pin around the first axis and adapted to roll on a cam. The support element comprises two separate parts, generally semi-cylindrical, each having a contact face, in contact with one other, and a holding feature for maintaining parts assembled together.

12 Claims, 7 Drawing Sheets

(56) References Cited

U.S. PATENT DOCUMENTS

| | | | | |
|---|---|---|---|---|
| 4,535,641 A | * | 8/1985 | Kriz | F02M 59/102 |
| | | | | 123/90.25 |
| 4,617,903 A | * | 10/1986 | Heberle | F02M 59/20 |
| | | | | 123/501 |
| 6,302,075 B1 | * | 10/2001 | Krieg | F01L 1/185 |
| | | | | 123/90.41 |
| 2008/0006233 A1 | * | 1/2008 | Bartley | F01L 1/146 |
| | | | | 123/90.48 |

FOREIGN PATENT DOCUMENTS

| | | | | |
|---|---|---|---|---|
| EP | 2607636 A | | 6/2013 | |
| EP | 2607636 A1 | * | 6/2013 | ............ F16H 25/08 |
| JP | 2013029027 A | | 2/2013 | |

\* cited by examiner

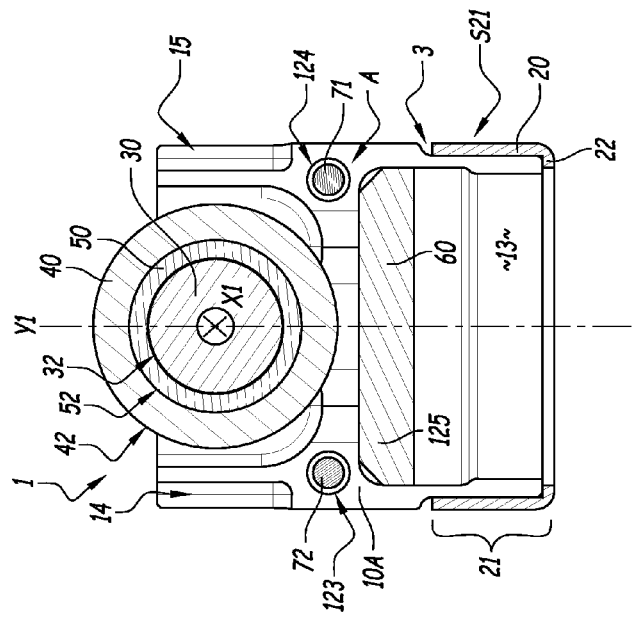
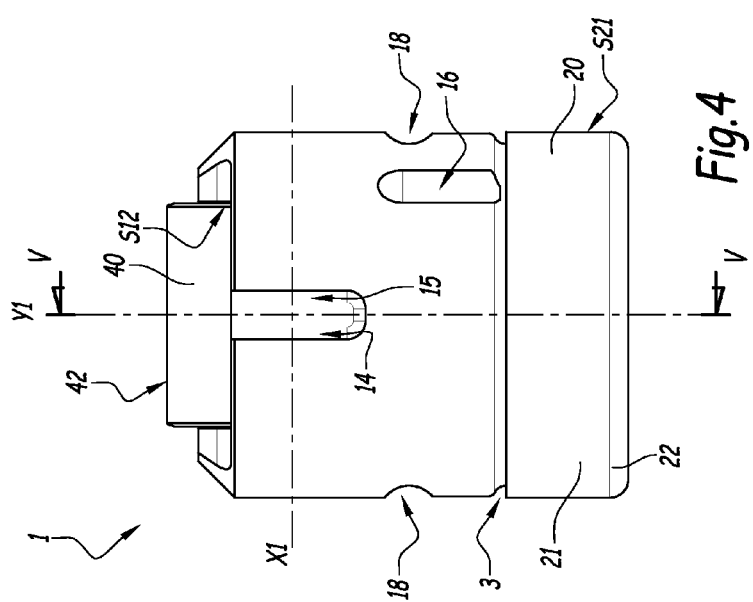

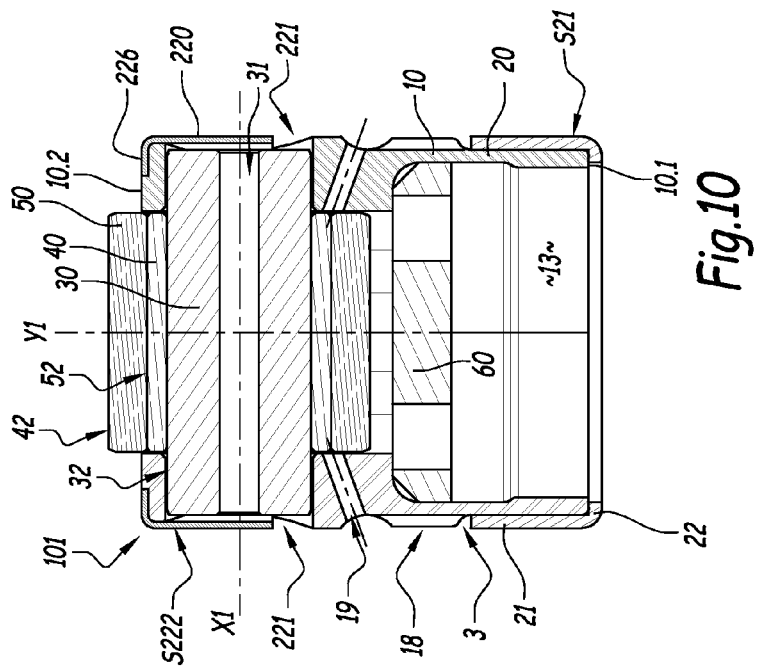
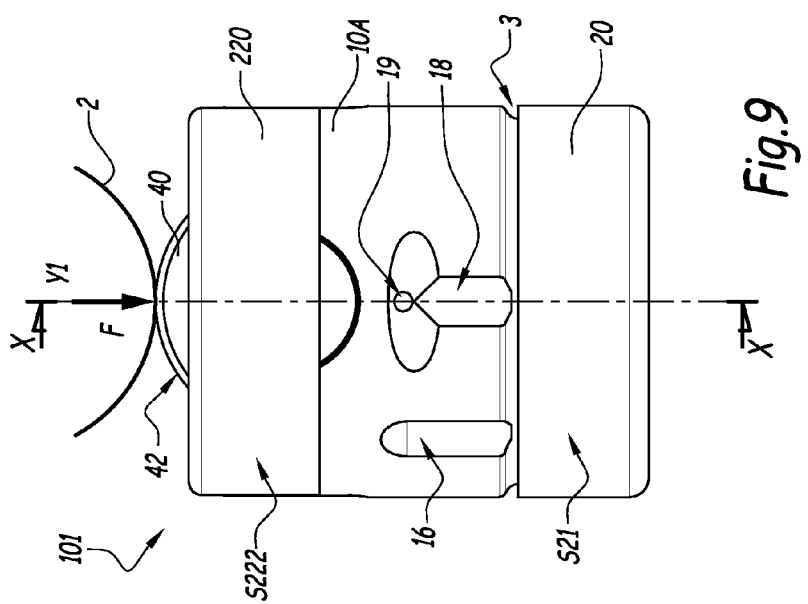

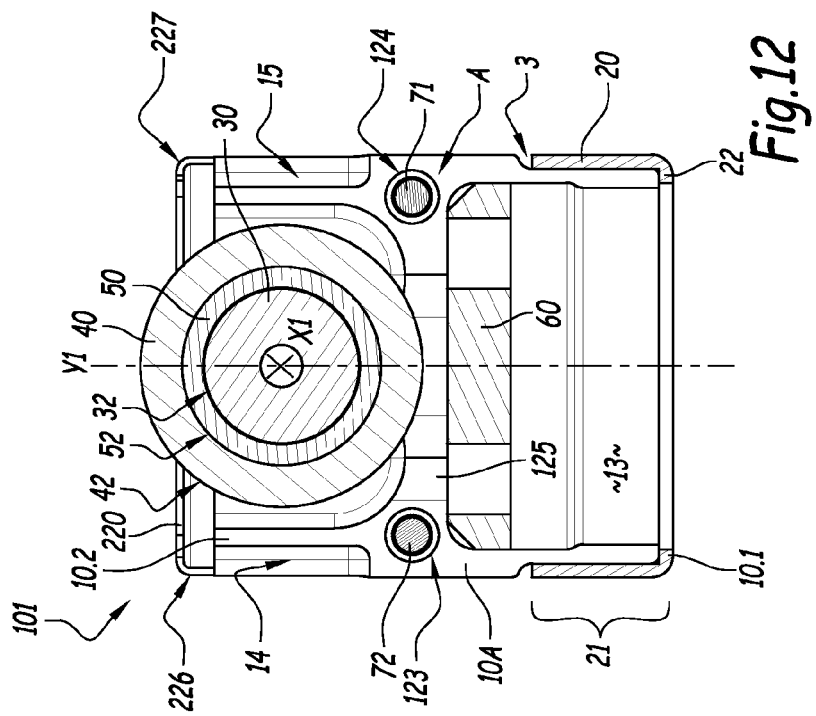
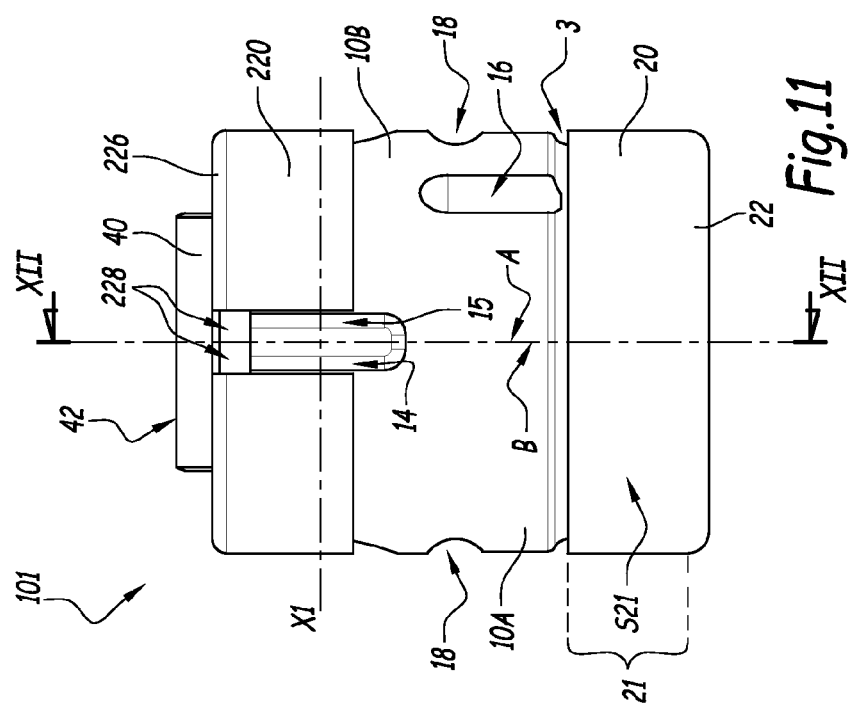

MECHANICAL SYSTEM FORMING A CAM FOLLOWER OR A ROCKER ARM

CROSS REFERENCE TO RELATED APPLICATION

This is a Non-Provisional Patent Application, filed under the Paris Convention, claiming the benefit of Europe (EP) Patent Application Number 14306538.1, filed on Sep. 30, 2014, which is incorporated herein by reference in its entirety.

TECHNICAL FIELD OF THE INVENTION

The invention concerns a mechanical system, forming a cam follower or a rocker arm, and comprising a pin or a roller provided with at least one recess forming a lubricant reservoir. The invention also concerns an injection pump or a valve actuator comprising such a mechanical system. The invention also concerns a method for manufacturing such a mechanical system.

BACKGROUND OF THE INVENTION

Classically, a cam follower comprises at least a tappet, a pin and a roller. The tappet extends along a longitudinal axis, while the pin and the roller are centered on a transverse axis. The tappet is formed with two lateral flanges, delimiting an intermediate gap between them and each comprising a cylindrical bore. The roller is positioned in the intermediate gap, between both flanges and bores. The pin is fitted in the two bores, such that the roller is movable in rotation relative to the pin around its axis. The pin may be caulked, in other words plastically deformed, on both opposite ends to create a mechanical connection by press-fit in the tappet bores.

When the cam follower is in service, the roller collaborates with a cam synchronized with the internal combustion engine camshaft. The rotation of the camshaft leads to a periodic displacement of a piston of the pump that rests against the tappet, to allow fuel to be delivered. The tappet is movable back and forth along the longitudinal axis in a bore belonging to the injection pump, with the cylindrical outer surface of the tappet sliding in this bore. The roller is movable in rotation around its central axis. The body of tappet is in one piece, made by forging and re-machined for forming lubricating grooves on the external surface, which is complicated and expensive.

As shown by example in EP-A-2 607 636, it is known to provide the tappet with a single piece body equipped with two flanges having holes for supporting the ends of the pin on which the roller is mounted. The holes in the flanges each have a radial recess adapted to receive a plastically deformed radial portion of the caulked end of the pin. For assembling the cam follower, the roller is mounted between the flanges of the tappet. Then, the pin is inserted in the roller, through the holes of the flanges, the ends of the pin being supported by the flanges. Then, the ends of the pin are caulked. The caulking of the pin is a costly operation, and time consuming. Besides that, the body of the tappet has to be machined, which is long and expensive.

SUMMARY OF THE INVENTION

The aim of the invention is to provide an improved mechanical system having a reduced cost.

To this end, the invention concerns mechanical system forming a cam follower or a rocker arm, the mechanical system comprising:
  a support element,
  a pin extending between two opposite ends along a first axis and supported by the support element, and
  a roller adapted to receive pin, mounted on pin, movable in rotation relative to the pin around the first axis and adapted to roll on a cam,
wherein the support element comprises:
  two separate parts generally semi-cylindrical, having each a contact face, in contact with each other, and
  holding system maintaining parts assembled together.

Thanks to the invention, the two parts of the support element allow the pin to be flocked easily, without requiring a caulking operation or additional circlips. Moreover, assembling the mechanical system is simplified.

According to further aspects of the invention which are advantageous but not compulsory, such a mechanical system may incorporate one or several of the following features:
  Parts are identical.
  Contact faces are perpendicular to first axis.
  Holding system comprise assembling pins fitted in cavities managed in contact face of each part of mechanical element.
  The external surface of mechanical element includes two anti-rotational grooves each having a first portion belonging to a first part of mechanical element, and a second portion belonging to a second part of mechanical element.
  Holding system include a first holding ring fitted around a first end of mechanical element.
  Each part of mechanical element has a hole supporting an end of pin.
  Holes are blind and block the translation of pin along first axis.
  Holes are through holes.
  Holding system include a second holding ring fitted around a second end of mechanical element, blocking the translation of pin along first axis.
  Holding ring(s) are fretted on support element.
  The mechanical system comprises a rolling bearing, a sliding bearing or a bushing positioned at the interface between the pin and the roller element.

Another object of the invention is an injection pump for a motor vehicle, comprising such a mechanical system.

Another object of the invention is a valve actuator for a motor vehicle, comprising such a mechanical system.

Another object of the invention is a method for producing such a mechanical system, wherein:
  pin and roller are assembled together,
  the two parts of support element are assembled together around pin and roller,
  holding member is fitted on parts of support element.

BRIEF DESCRIPTION OF THE DRAWINGS

The invention will now be explained in correspondence with the annexed figures, as an illustrative example, without restricting the object of the invention. In the annexed figures:

FIG. 4 is a front view of the mechanical system of FIG. 1;

FIG. 5 is a sectional view along plane V of FIG. 4;

FIG. 9 is a lateral view of the mechanical system of FIG. 8;

FIG. 10 is a sectional view along plane X of FIG. 9;

FIG. 11 is a front view of the mechanical system of FIG. 8; and

FIG. 12 is a sectional view along plane XII of FIG. 10.

DETAILED DESCRIPTION OF SOME EMBODIMENTS

Figure 1:
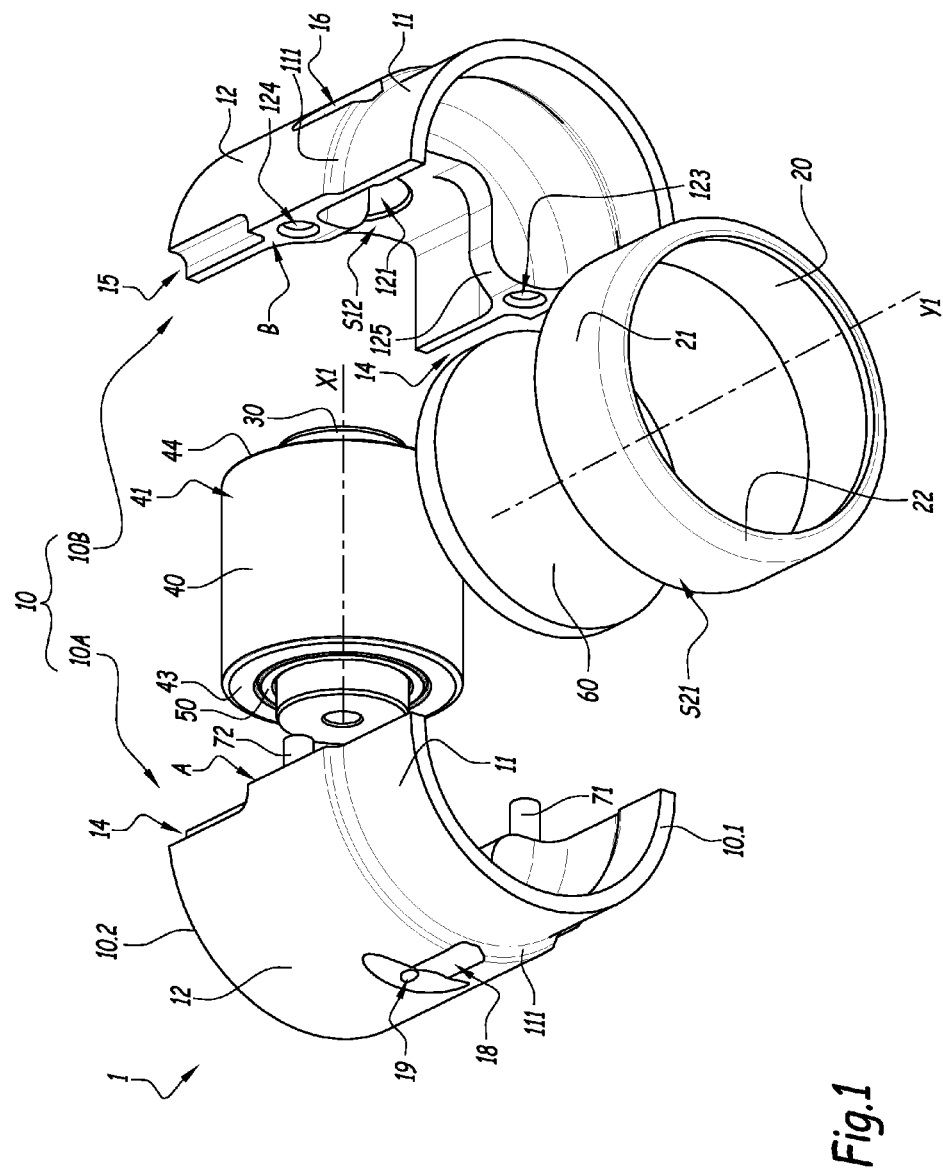
FIG. 1 is an exploded perspective view of a mechanical system according to the invention, of the cam follower type, comprising a tappet, a pin and a roller.
Figure 3:
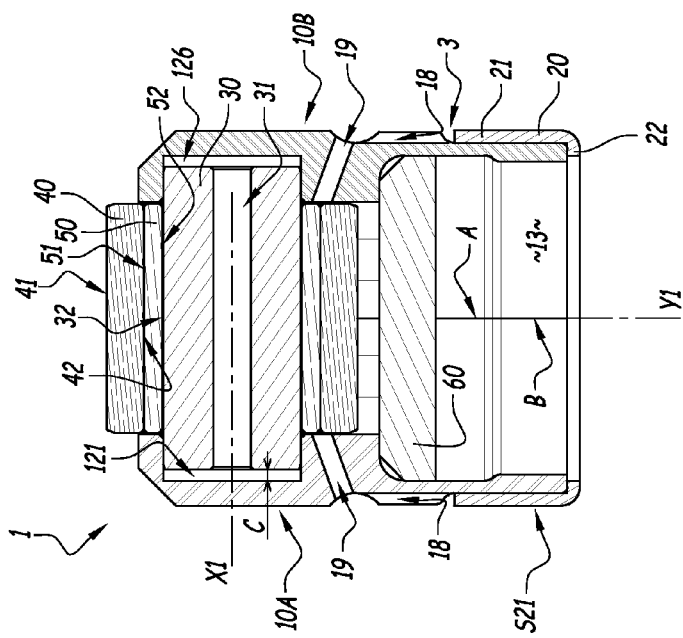
FIG. 3 is a sectional view along plane II of FIG. 2.
Figure 2:
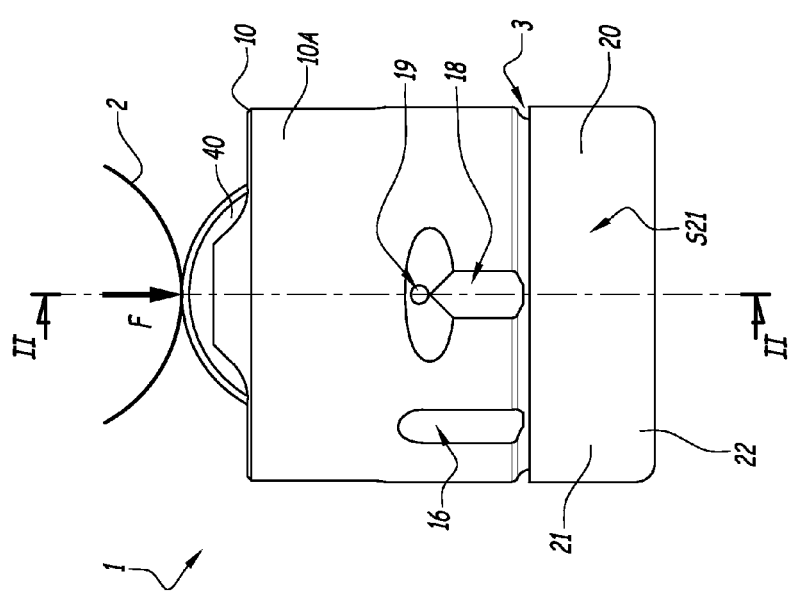
FIG. 2 is a lateral view of the mechanical system of FIG. 1.
Figure 7:
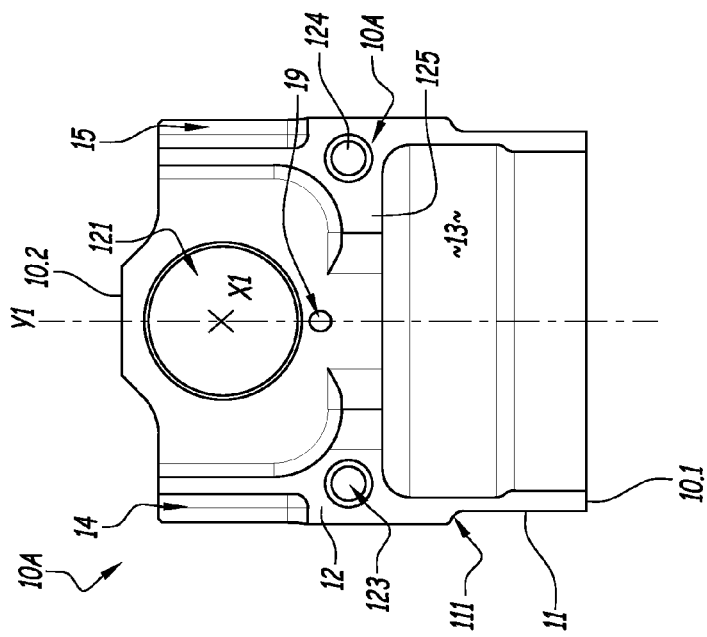
FIG. 7 is a lateral view of the part of FIG. 6, along arrow F7.
Figure 6:
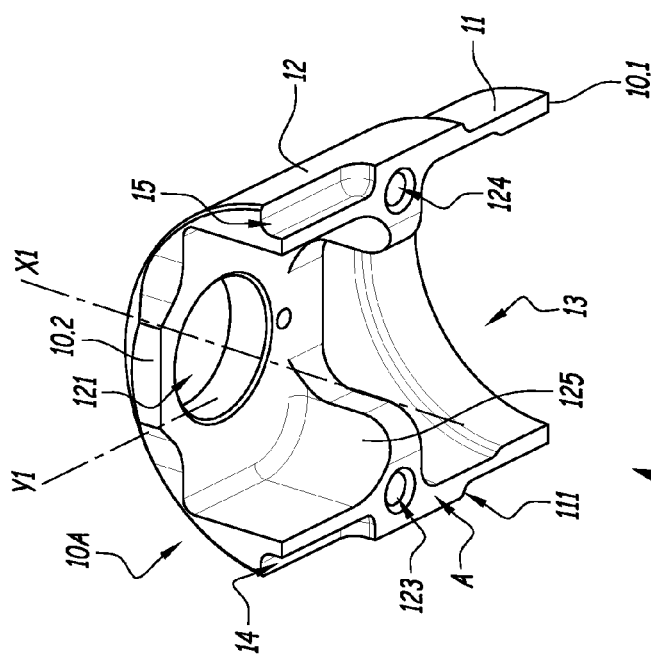
FIG. 6 is a perspective view of a part of the tappet of FIG. 1.

The mechanical system 1 represented on FIGS. 1 to 7 is of the cam follower type, adapted to equip an injection pump for a motor vehicle, not shown.

System 1 comprises a tappet 10, a holding ring 20, a pin 30 and a roller 40, together forming a plain bearing. In heavy duty applications such as in diesel truck engines, there is a lack of space for the implementation of a rolling bearing, thus justifying the use of a plain bearing. Pin 30 and roller 40 are centered on a transverse axis X1, while tappet 10 and ring 20 are centered on a longitudinal axis Y1. Axes X1 and Y1 are perpendicular. Roller 40 is adapted to roll on a cam 2, shown on FIG. 2.

Tappet 10 comprises a first body part 10A and a second separated body part 10B generally semi-cylindrical. By "separate", it is understood that parts 10A and 10B are mechanically independent. Tappet 10 is formed by assembling different body parts 10A and 10B.

Body parts 10A and 10B delimit a cavity 13 inside tappet 10. This cavity 13 is adapted to receive a shaft or plunger 60 for moving tappet 10 along axis Y1. Plunger 60 is preferably made by stamping. Tappet 10 is movable back and forth along axis Y1, in a non-represented bore belonging to the injection pump.

Tappet 10, in particular parts 10A and 10B, plunger 60 and holding ring 20, are made of metal, by example steel. Material of the tappet 10 is chosen resistant to oil flow and temperature variations. Holding ring 20 is preferably made by stamping and can be heat treated, which is cheaper than other processes.

Parts 10A and 10B of tappet 10 are identical. This is easier for assembling tappet 10. Each have a plane contact face A or B, parallel to longitudinal axis Y1 and perpendicular to transversal axis X1. When parts 10A and 10B are assembled together, faces A and B are in contact.

Along longitudinal axis Y1, tappet 10 has a first portion or holding portion 11 delimiting a first end or lower end 10.1 of tappet 10, on the side of cavity 13, and a second portion on bearing portion 12 delimiting a second end or top end 10.2 on the side of pin 30 and roller 40. Holding portion 11 is cooperating with holding ring 20, for the assembly of parts 10A and 10B of tappet 10.

Furthermore, tappet 10 forms a support element for pin 30 and roller 40. Specifically, bearing portion 12 of tappet 10 is adapted to receive pin 30, on which roller 40 is mounted. To this end, bearing portion 12 of each part 10A and 10B comprises an internal blind hole or recess 121 of circular shape adapted to receive an end 35 or 36 of pin 30. Recesses 121 are arranged on an internal plane surface S12 of each part 10A and 10B. Surfaces S12 delimit an intermediate gap 29 between them.

Roller 40 has an outer cylindrical surface 41 and an internal cylindrical bore 42, both merging with transversal axis X1.

Pin 30 comprises a cylindrical outer surface 32 extending between pin ends 35 and 36. When pin 30 is inserted in recesses 121 of tappet 10, surface 32 is adjusted with bore 42 of roller 40, such that roller 40 is movable in rotation relative to pin 30 around axis X1. There is an axial clearance C between each pin end 36 and 36 and the bottom of recesses 121, along transversal axis X1. Both pin 30 and roller 40 axes merge with transversal axis X1.

Bottom of recesses 121 block the translation of pin 30 back and forth, along transversal axis X1. In this way, no additional piece is required for blocking pin 30. Thus, the design of tappet 10 is simple.

A bushing 50 is located at the interface between pin 30 and roller 40. Bushing 50 has an outer cylindrical surface 51 and an inner cylindrical bore 52. During assembly of system 1, surface 51 of bushing 50 is adjusted with bore 42 of roller 40, while surface 32 of pin 30 is adjusted with bore 52 of bushing 50, such that roller 40 is movable in rotation relative to pin 30 around axis X1. Tappet 10 supports pin 30, which supports bush 50, which supports roller 40. Pin 30, roller 40 and bushing 50 axes merge with axis X1.

During assembly of system 1, a radial clearance may be present between the surface 32 of pin 30 and the inner surface of each bore 25 and 26, radially to axis X1. Existence and value of clearance depends on manufacturing tolerances of pin 30, as bores 25 and 26. Preferably, clearance is as small as possible.

In a non-depicted variant, bushing 50 is eliminated or replaced by another type of sliding element, such as needle roller bearings with plastic cage, used for injection pumps for gasoline engines.

Roller 40 is adapted to roll on cam 2. More precisely surface 41 can roll on the outer surface of cam 2. When cam 2 and roller 40 are cooperating, a force F is applied on surface 41 along axis Y1.

In practice, several areas within system 1 have to be lubricated to ensure proper operation of system 1, including an interface between pin 30 and roller 40. The surfaces to be lubricated include inner surface 41 of roller 40 and outer surface 32 of pin 30, together with lateral faces 43 and 44 of roller 40 and lateral wall of recesses 121.

If surfaces 32, 42, 43 and 44 are not properly lubricated, friction between recesses 121, pin 30 and tappet 40 may bring on over-heating of system 1 and accelerated ageing.

Holding portion 11 has a cylindrical hollow shape, centered on longitudinal axis Y1. Holding portion 11 is connected to holding portion 12 of tappet 10 via an annular shoulder 111 centered on longitudinal axis Y1. The diameter of an outer cylindrical surface of bearing portion 12 is higher than the diameter of an outer cylindrical surface of holding portion 11.

Bearing portion 12 of each part 10A and 10B has an internal annular protrusion, forming a rib 125 extending perpendicularly to longitudinal axis Y1, towards axis Y1. Cavities, for example holes 123 and 124, are arranged on faces A and B of tappet 10, in ribs 125.

Assembling pins 71 and 72 are fitted inside holes 123 and 125, for maintaining faces A and B in contact. Optionally, pins 71 and 72 are plastically deformed during assembly.

The geometry and the dimensions of holding portion 11 are designed to fit into holding ring 20.

Holding ring 20 has a cylindrical portion or sleeve 21 in contact with holding portion 11, and an annular shoulder 22 protruding towards longitudinal axis Y1. Lower end 10.1 of tappet 10 abuts against shoulder 22. Sleeve 21 has an external cylindrical sliding surface S21, intended to slide against walls of a bore of injection pump. To that extent, holding ring 20 is a guiding member for the sliding of mechanical system 1.

Holding ring 20 is fretted on tappet 10, or assembled by adhesive means.

Bearing portions 12 are provided each with a first external and linear lubricating groove 16, parallel to longitudinal axis Y1. Bearing portions 12 have second external lubricating grooves 18 shaped like a "T", with a lubricating hole 19 at the bottom. First grooves 16, and respectively second grooves 18, are diametrically opposed.

A lubricating groove 3 is disposed on external surface of tappet 10, between a top end of holding ring 20 and shoulder 111 of tappet 10. Groove 3 has an annular shape, perpendicular to longitudinal axis Y1.

Each part 10A and 10B of tappet 10 is provided with two anti-rotation grooves 14 and 15 managed on the external surface of holding portion and having a top end opening on top end 10.2 of tappet 10. Bottom end of each groove 14 and 15 are closed by the material of tappet 10. Grooves 14 and 15 are parallel to longitudinal axis Y1. Each groove has a first portion 14 or 15 belonging to one of parts 10A and 10B, and a second portion 15 or 14 respectively, belonging to the other part 10B or 10A. Thus, each groove is formed by two halves 14 and 15, each belonging to a part 10A or 10B. Grooves 14 and 15 are diametrically opposed.

Parts 10A and 10B of tappet are made by a forging process or a sintering process. All the shapes of parts 10A and 10B, except holes 19, 123 and 124, can be obtained by a forging process. No additional machining is required.

Hereunder is described a method to produce system 1.

Bushing 50 is fitted in bore 42 of roller 40. Roller element 40 is positioned in intermediate gap 126, between recesses 121, in alignment with transversal axis X1. Lateral faces 43 and 44 of roller 40 are in contact with inner faces 23a and 23b of flanges 21 and 22. Pin 30 is fitted inside roller 40, more precisely inside inner bore 52 of bushing 50.

Assembling pins 71 and 72 are inserted in holes 123 and 124 of parts 10A and 10B. Both pins 71 and 72 can be fitted on holes 123 and 124 of a first part 10A or 10B, or each part 10A and 10B can be provided with a pin 71 or 72.

When pin 30, bushing 50 and roller 40 are assembled together, the two parts 10A and 10B of tappet 10 are assembled together around roller 40, bushing 50 and pin 30, with assembling pins 71 and 72 being sandwiched between parts 10A and 10B.

Pin 30 is movable in rotation and in translation relative to bearing body 20, around transversal axis X1.

Then, holding ring 20 is inserted around holding portion 11 of tappet 10.

No caulking operation, or additional part, is needed for retaining pin 30 inside tappet 10.

Figure 8:
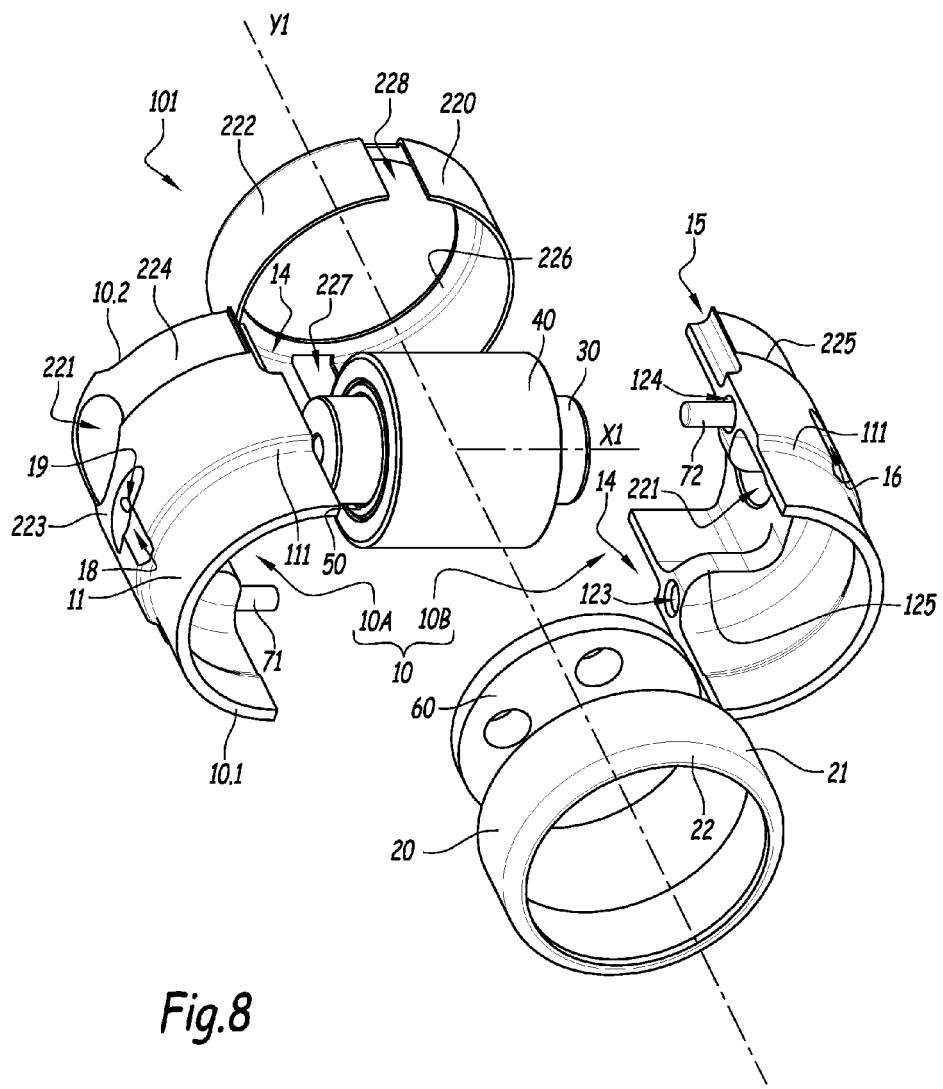
FIG. 8 is an exploded perspective view of a mechanical system according to a second embodiment of the invention.

FIGS. 8 to 12 show a mechanical system 101 according to a second embodiment of the invention. The elements of mechanical system 101 identical to the corresponding ones of mechanical system 1 bear the same references. Hereunder, the elements of mechanical system 101 similar to the same elements of mechanical system 1 are not described in detail, insofar as the description of system 1 can be transposed to system 101.

Mechanical system 101 includes a tappet 10, a first holding ring 20, a pin 30, a roller 40, a bushing 50, a plunger 60, assembling pins 71 and 72, and a second holding ring 220.

Tappet 10 is made of two separate parts 10A and 10B, provided each with a holding portion 11 and a bearing portion 12. Bearing portion 12 has two through hole 221 passing through parts 10A or 10B, replacing blind hole 121.

Bearing portion 12 has a cylindrical lower portion 223 connected to holding portion 11 via shoulder 111, and a cylindrical upper portion 224 defining upper end 10.1 of tappet 10. The diameter of lower portion 223 is higher than the diameter of upper portion 224. An annular shoulder 225 is connecting portions 223 and 224.

The geometry and the dimensions of holding portion 11 are designed to fit into holding ring 20.

The second holding ring 220 has a cylindrical portion or sleeve 222 in contact with lower portion 223 of tappet 10, and an annular shoulder 225 protruding towards longitudinal axis Y1. Upper end 10.2 of tappet 10 abuts against shoulder 226. Sleeve 222 has an external cylindrical sliding surface S222, intended to slide against walls of a bore of injection pump. To that extent, holding ring 220 is a guiding member for the sliding of mechanical system 1.

Holding ring 220 is provided with two slots 227 and 228, diametrically opposed, opening on anti-rotational grooves 14 and 15 of tappet 10. Holding ring 220 is fretted on tappet 10, or assembled by adhesive means.

The method for producing system 101 is similar to the method described above, in reference to system 1. In addition, the second holding ring 220 is fitted around parts 10A and 10B of tappet 10 for retaining pin 30 back and forth, along transversal axis X1. Thus, second holding ring 220 blocks the translation of pin 30, back and forth, along axis 10, with respect to tappet 10.

Other non-show embodiments can be implemented within the scope of the invention. For example, support element 10 may have a different configuration depending on the intended application of system 1.

Parts 10A and 10B of tappet 10 are not necessarily identical.

Moreover, the mechanical system 1 according to the invention is not limited to a cam follower. For example, system 1 may form a rocker arm, wherein the support element 10 is an arm movable in rotation along a pivot axis parallel to axis X1.

According to another non-shown embodiment, system 1 may comprise a rolling or sliding bearing, with bearing elements positioned at the interface between pin 30 and roller 40.

Moreover, groove 3 does not necessarily extend on 360° around longitudinal axis Y1. For example, groove 3 can be semi-annular and extending on 180° around longitudinal axis Y1.

Rings 20 and 220 and pins 71 and 72, together with holes 123 and 124, are holding system for holding parts 10A and 10B assembled together. They can be replaced by other holding system such as a laser welding or adhesive means.

In addition, technical features of the different embodiments can be, in whole or part, combined with each other. Thus, mechanical systems 1 and 101 can be adapted to the specific requirements of the application.

What is claimed is:

1. A mechanical system forming one of a cam follower or a rocker arm, the mechanical system comprising:
    a support element having an annular bearing portion with
        a first diameter and an annular holding portion with a second diameter which is less than the first diameter such that an annular shoulder is formed between the annular bearing portion and the annular holding portion,
a pin extending between two opposite ends along a first axis and supported by the support element, and
a roller adapted to receive the pin, mounted on the pin, movable in rotation relative to the pin around the first axis and adapted to roll on a cam,
wherein the support element comprises:
two separate parts generally semi-cylindrical, each having a contact face, in contact with each other, and
a holding ring formed by an annular sleeve configured for positioning over the annular holding portion such that when the holding ring is fully positioned over the holding portion an annular lubricating groove is formed between the annular shoulder and the holding ring while the holding ring maintains the two separate parts assembled together.

2. The mechanical system according to claim 1, wherein two separate parts are identical.

3. The mechanical system according to claim 1, wherein the contact faces are perpendicular to the first axis.

4. The mechanical system according to claim 1, further comprising assembly pins fitted in cavities managed in the contact face of each part of the support element.

5. The mechanical system according to claim 4, wherein the holes are blind and block the translation of the pin along the first axis.

6. The mechanical system according to claim 1, wherein the external surface of the support element includes two anti-rotational grooves, each anti-rotational groove having a first portion belonging to a first part of the support element, and a second portion belonging to a second part of the support element.

7. The mechanical system according to claim 1, wherein the first holding ring is fitted around a first end of the support element.

8. The mechanical system according to claim 7, wherein the holding system includes a second holding ring fitted around a second end of the mechanical element, blocking the translation of the pin along first axis.

9. The mechanical system according to claim 7, wherein the holding ring is fretted on the support element.

10. The mechanical system according to claim 1, wherein each part of the support element has a hole supporting an end of the pin.

11. The mechanical system according to claim 10, wherein the holes are through holes.

12. The mechanical system according to claim 1, further comprising a positional guiding element positioned at the interface between the pin and the roller element, wherein the positional guiding element is one of a rolling bearing, a sliding bearing or a bushing.

* * * * *